(12) United States Patent
Kang et al.

(10) Patent No.: US 6,239,560 B1
(45) Date of Patent: May 29, 2001

(54) SYSTEM FOR CORRECTING ELECTRON BEAM FROM SINGLE CATHODE IN COLOR CRT

(75) Inventors: Si Wook Kang, Kyungsangbuk-do; Sung Gil Kim, Taegu-kwangyoksi, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/225,835

(22) Filed: Jan. 6, 1999

(30) Foreign Application Priority Data

Jan. 6, 1998 (KR) .................................................. 98/149

(51) Int. Cl.[7] ...................................................... G09G 1/28
(52) U.S. Cl. ................ 315/368.11; 315/364; 315/368.28
(58) Field of Search .............................. 315/364, 308.11, 315/368.28, 381, 382, 370; 313/361.1, 421, 446; G09G 1/28

(56) References Cited

U.S. PATENT DOCUMENTS

| | | | |
|---|---|---|---|
| 3,638,064 | * | 1/1972 | Hosoya et al. ........................ 315/13 |
| 4,218,634 | * | 8/1980 | Takenaka ................................ 315/16 |
| 4,763,047 | * | 8/1988 | Watanabe et al. .................... 315/382 |
| 4,851,741 | * | 7/1989 | Shirai et al. ......................... 315/382 |

FOREIGN PATENT DOCUMENTS 7-78574   3/1996   (JP) ................................ H01J/29/50

* cited by examiner

Primary Examiner—Don Wong
Assistant Examiner—Hoang Nguyen

(57) ABSTRACT

System for correcting an electron beam from a single cathode in an electron gun for a color CRT, in which the single electron beam emitted from the single cathode is controlled by a magnetic field generating device synchronous to an electron beam deflecting signal and a video signal applied to the cathode for realizing an optimal image, the system including a time division distributor for receiving a video signal and generating one of electron beam signals corresponding to a red, a green, or a blue fluorescent material, an electron gun with a single cathode for receiving any one of red, green, blue signals from the time division distributor and emitting a single electron beam, a deflection yoke for receiving a deflection signal and deflecting the electron beam emitted from the cathode to an entire region of a screen, a digital controller for receiving a signal from the time division distributor and the deflection signal, and a magnetic field generating device for receiving a signal from the digital controller and correcting the electron beam in advance before deflection of the electron beam to a preset position.

7 Claims, 8 Drawing Sheets

SYSTEM FOR CORRECTING ELECTRON BEAM FROM SINGLE CATHODE IN COLOR CRT

BACKGROUND OF THE INVENTION

1. Field of the Invention

The present invention relates to a color cathode ray tube, and more particularly, to a system for correcting an electron beam from a single cathode in an electron gun for a color CRT, in which the single electron beam emitted from the single cathode is controlled by a magnetic field generating device synchronous to an electron beam deflecting signal and a video signal applied to the cathode for realizing an optimal image.

2. Background of the Related Art

A general electron gun in a color cathode ray tube has three in-line cathodes for emitting electron beams. The three electron beams emitted from the cathodes are converged in the electron gun, and deflected by a non-uniform magnetic field having a self-convergence function from deflection yokes. Then, the electron beams pass through an electron beam pass through hole in a shadow mask, and reach to a panel having a coat of fluorescent material of red, green, and blue, to realize an image. The electron beams are involved in deterioration, such as mis-landing, mis-convergence, distortion, and change of spacing between the three electron beams due to the deflection yokes. If the screen is mad larger and flatter according to the trend of recent consumer's taste change, the deterioration of the electron beams becomes greater, degrading a quality of an image on the color cathode ray tube. Despite of the self-convergence function, the deflection yokes are involved in a longer distance of travel of the electron beams as the screen becomes larger, causing extents of the mis-convergence and the mis-landing greater. FIG. 1 illustrates an example of a mis-convergence of the electron beams wherein the solid lines represent mis-convergence and the dotted lines represent a right convergence, and FIG. 2 illustrates an example of mis-landings of the electron beams in the vicinities of the fluorescent materials wherein the solid lines represent the mis-landings and the dotted lines represent right landings. The distortion is caused by a disagreement between a deflection center of the deflection yokes and positions of the electron beams and an asymmetry of a deflection force. FIG. 3 illustrates an example of a green electron beam deviated to a fourth quadrant from the deflection center. The change of spacing between the three electron beams results in changes of incident angles of the three electron beams to the shadow mask as the electron beams are deflected because positions of the red, and blue electron beams are spaced from the deflection center. These changes of the spacings between the three electron beams passed through the shadow mask and reached to the panel, i.e., a spacing between the red beam and a green beam and a spacing between the green beam and a blue beam affect to a picture quality.

FIG. 4 illustrates a color purity magnet 10 mounted on an outside end of a neck portion for correcting the mis-landings and the mis-convergence of the electron beams before the electron beams pass through a magnetic field from the deflection yokes. The color purity magnet 10 is a device mounted for adjusting the electron beams by adjusting a relative position of a set of combinations of two annular magnets 10a, 10b and 10c each magnetized to have two poles, four poles, or six poles, for final compensation of an assembly error after assembly of the deflection yokes or the electron gun.

FIGS. 5A–5C illustrate examples of shifts of the electron beams caused by the set of combinations of two annular magnets 10a, 10b, 10c.

Referring to FIG. 5A, it can be known that a mis-landing of the electron beam to the green fluorescent material can be minimized if a two polar annular magnet 10a is adjusted. However, since the two polar annular magnet 10 also gives an influence both to the red, and the blue beams, the adjustment of a particular electron beam only is not possible in a case the three electron beams are present on the same time. And, because the set of combinations of two annular magnets 10a, 10b, and 10c of two, four or six poles are adjusted for an optimal electron beam landing of respective electron beams on a specific location of the panel before mounting on the neck, the electron beams can not be made to land at optimal positions for every deflection of the electron beams.

SUMMARY OF THE INVENTION

Accordingly, the present invention is directed to a system for correcting an electron beam from a single cathode in an electron fun for a color CRT that substantially obviates one or more of the problems due to limitations and disadvantages of the related art.

An object of the present invention is to provide a system for correcting an electron beam from a single cathode in an electron gun for a color CRT, which can correct one of electron beams without affecting other electron beams incident to red, green and blue fluorescent materials, for making a precise electron beam correction.

Another object of the present invention is to provide a system for correcting an electron beam from a single cathode in an electron gun for a color CRT, which can variably correct the electron beam according to a place of deflection of the electron beam, for minimizing a distortion of the electron beam.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the system for correcting an electron beam from a single cathode in an electron gun for a color CRT includes a time division distributor for receiving a video signal and generating one of electron beam signals corresponding to a red, a green, or a blue fluorescent material, an electron gun with a single cathode for receiving any one of red, green blue signals from the time division distributor and emitting a single electron beam, a deflection yoke for receiving a deflection signal and deflecting the electron beam emitted from the cathode to an entire region of a screen, a digital controller for receiving a signal from the time division distributor and the deflection signal, and a magnetic field generating device for receiving a signal from the digital controller and correcting the electron beam in advance before deflection of the electron beam to a preset position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 6:
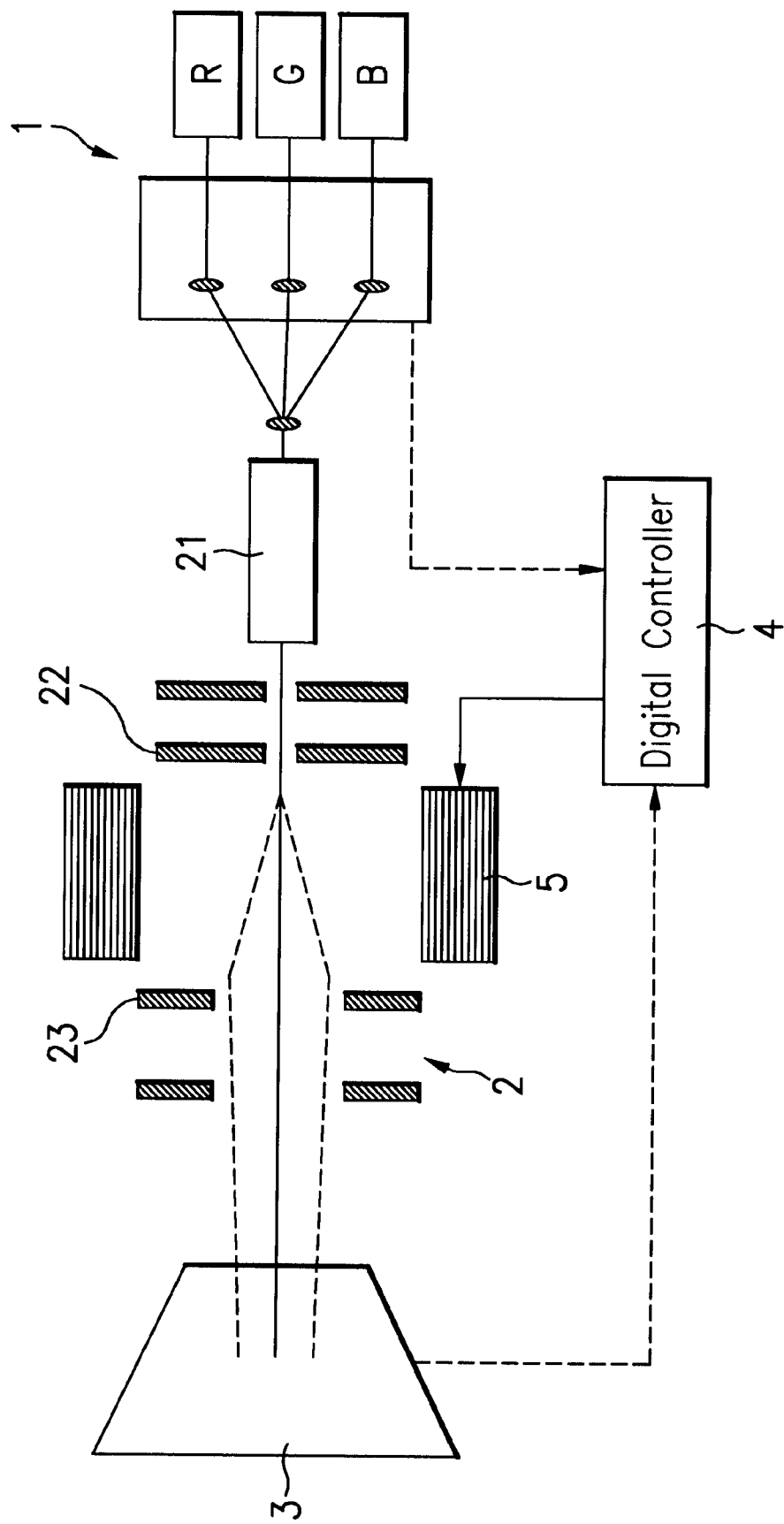
FIG. 6 schematically illustrates a system for correcting an electron beam from a single cathode in an electron gun for a color CRT in accordance with a preferred embodiment of the present invention; and, FIG. 7 illustrates a system of a device for generating a magnetic field in accordance with a preferred embodiment of the present invention.

Reference will now be made in detail to the preferred embodiments of the present invention, examples of which are illustrated in the accompanying drawings. FIG. 6 schematically illustrates a system for correcting an electron beam from a single cathode in an electron gun for a color CRT in accordance with a preferred embodiment of the present invention.

Referring to FIG. 6, the system for correcting an electron beam from a single cathode in an electron gun for a color CRT in accordance with a preferred embodiment of the present invention includes a time division distributor 1 for receiving a video signal and generating one of electron beam signals corresponding to a red, a green, or a blue fluorescent material, an electron gun 2 with a single cathode 21 for receiving the one of the electron beam signals from the time division distributor 1 and emitting a single electron beam, a deflection yoke 3 for receiving a deflection signal and deflecting the electron beam emitted from the cathode to an entire region of a screen, a digital controller 4 for receiving a signal from the time division distributor 1 and the deflection signal, and a magnetic field generating device 5 for receiving a signal from the digital controller 4 and correcting the electron beam in advance before deflection of the electron beam to a preset position. The magnetic field generating device 5 is preferably mounted between the deflection yoke 4 and a free end of a neck portion (not shown) of a color cathode ray tube for shifting the electron beam in advance by the magnetic field generating device 5 is more preferably mounted on an outside of the neck portion corresponding to a position between an acceleration electrode 22 and a free focus electrode or a focusing electrode 23 of the electron gun 2 inside of the neck portion for easy shifting of the electron beam.

Figure 7:
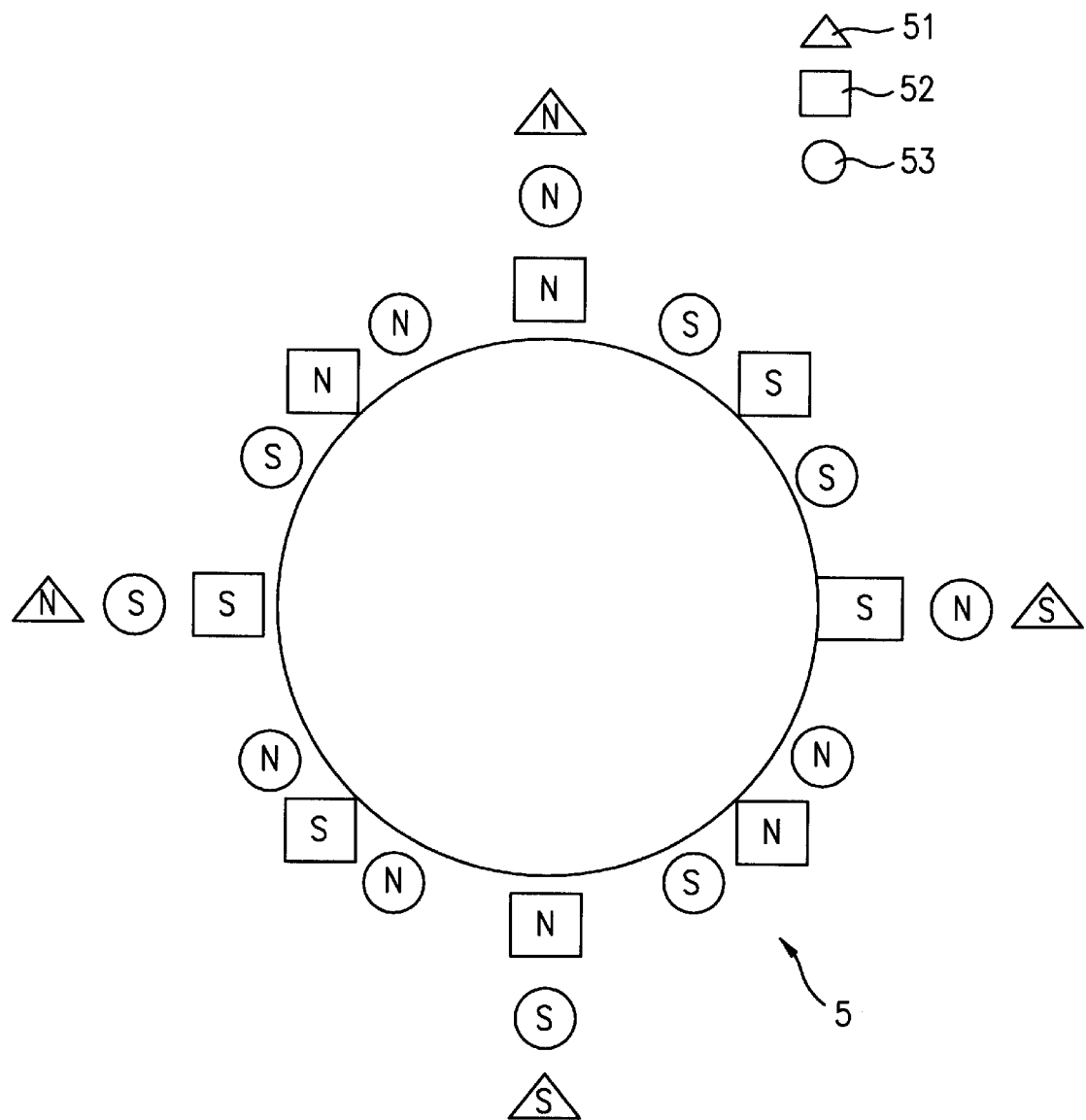

FIG. 7 illustrates a system of a device for generating a magnetic field in accordance with a preferred embodiment of the present invention.

Referring to FIG. 7, the device for generating a magnetic field in accordance with a preferred embodiment of the present invention includes a bipolar coil assembly 51 for generating a bipolar magnetic field, a tetrapolar coil assembly 52 for generating a tetrapolar magnetic field, and a hexapolar coil assembly 53 for generating a hexapolar magnetic field. The bipolar coil assembly 51 has a combination of coils for generating N, S, S, N poles at positions of 3, 6, 9, 12 o'clock with reference to an axis of the neck, respectively. The tetrapolar coil assembly 52 has a combination of coils for generating S, S, N, N, S, S, N, N poles at positions of 1.5, 3, 4.5, 6, 7.5, 9, 10.5, 12 o'clock with reference to an axis of the neck, respectively. And, the hexapolar coil assembly 53 has a combination of coils for generating S, S, N, N, S, S, N, N, S, S, N, N poles at positions of 1, 2, 3, 4, 5, 6, 7, 8, 9, 10, 11, 12 o'clock with reference to an axis of the neck respectively.

The operation of the present invention will be explained.

Figure 1:
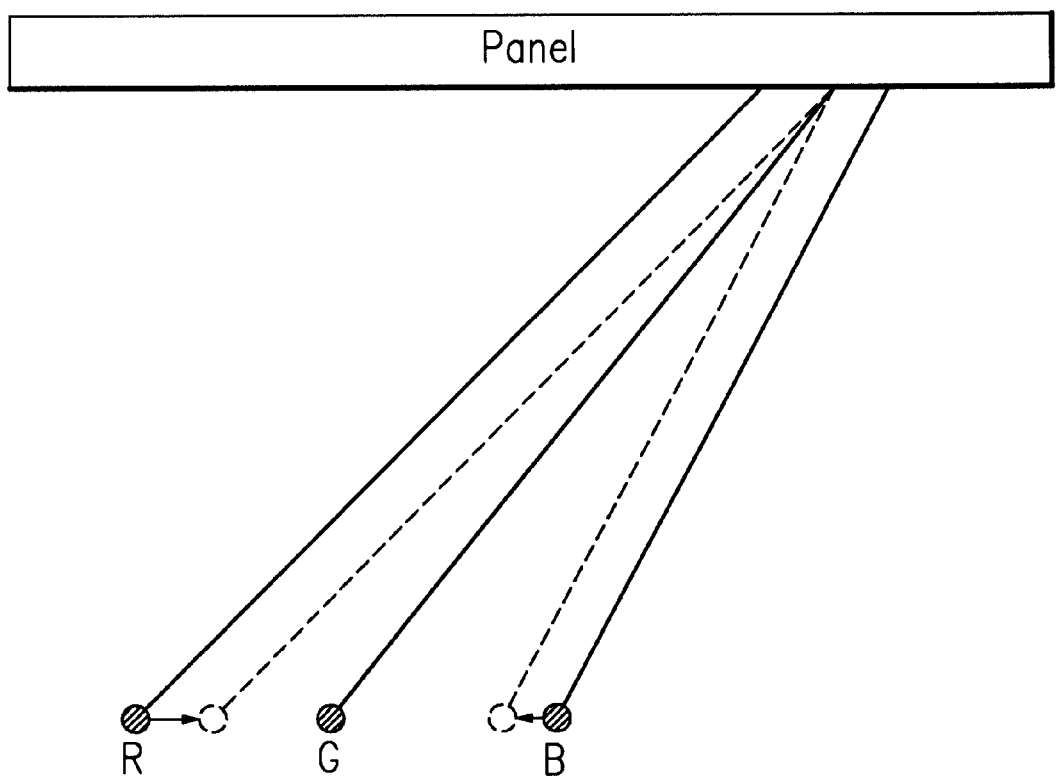
FIG. 1 illustrates an example of a mis-convergence of the electron beams wherein the solid lines represent mis-convergence and the dotted lines represent a convergence corrected by a magnetic field generating device of the present invention.
Figure 2:
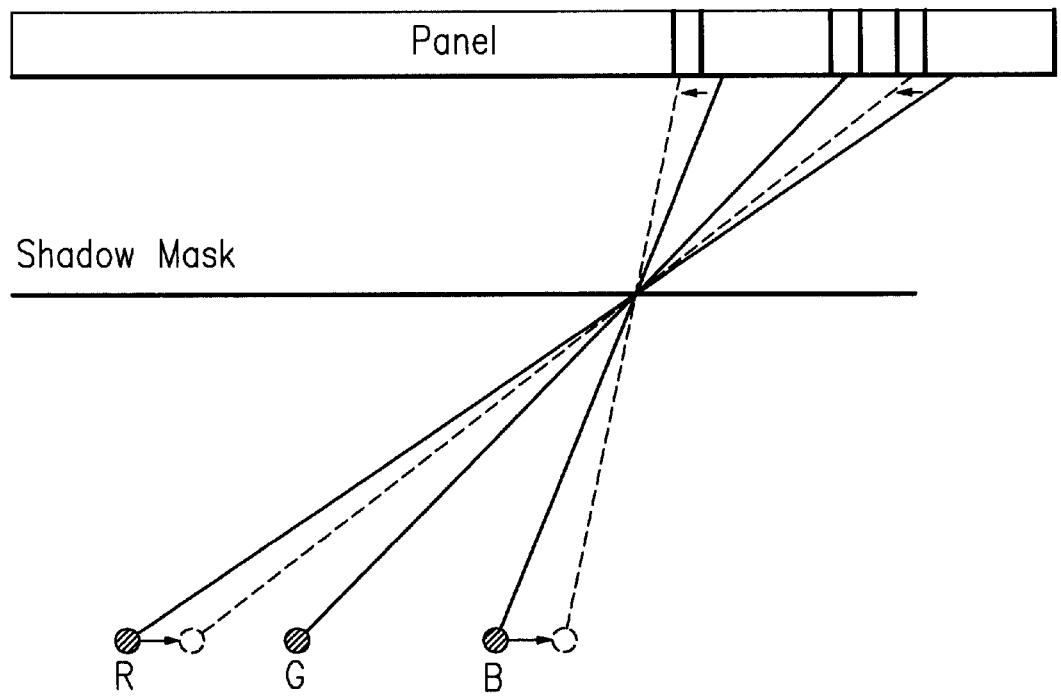
FIG. 2 illustrates an example of mis-landings of the electron beams in the vicinities of the fluorescent materials wherein the solid lines represent the mis-landings and the dotted lines represent landings corrected by a magnetic field generating device of the present invention.
Figure 3:
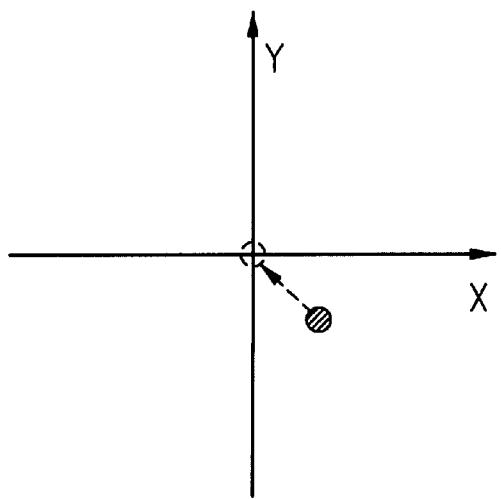
FIG. 3 illustrates an example of a green electron beam deviated to a fourth quadrant from a deflection center, wherein a dotted line represents the green electron beam corrected to the deflection center by a magnetic field generating device of the present invention.
Figure 4:
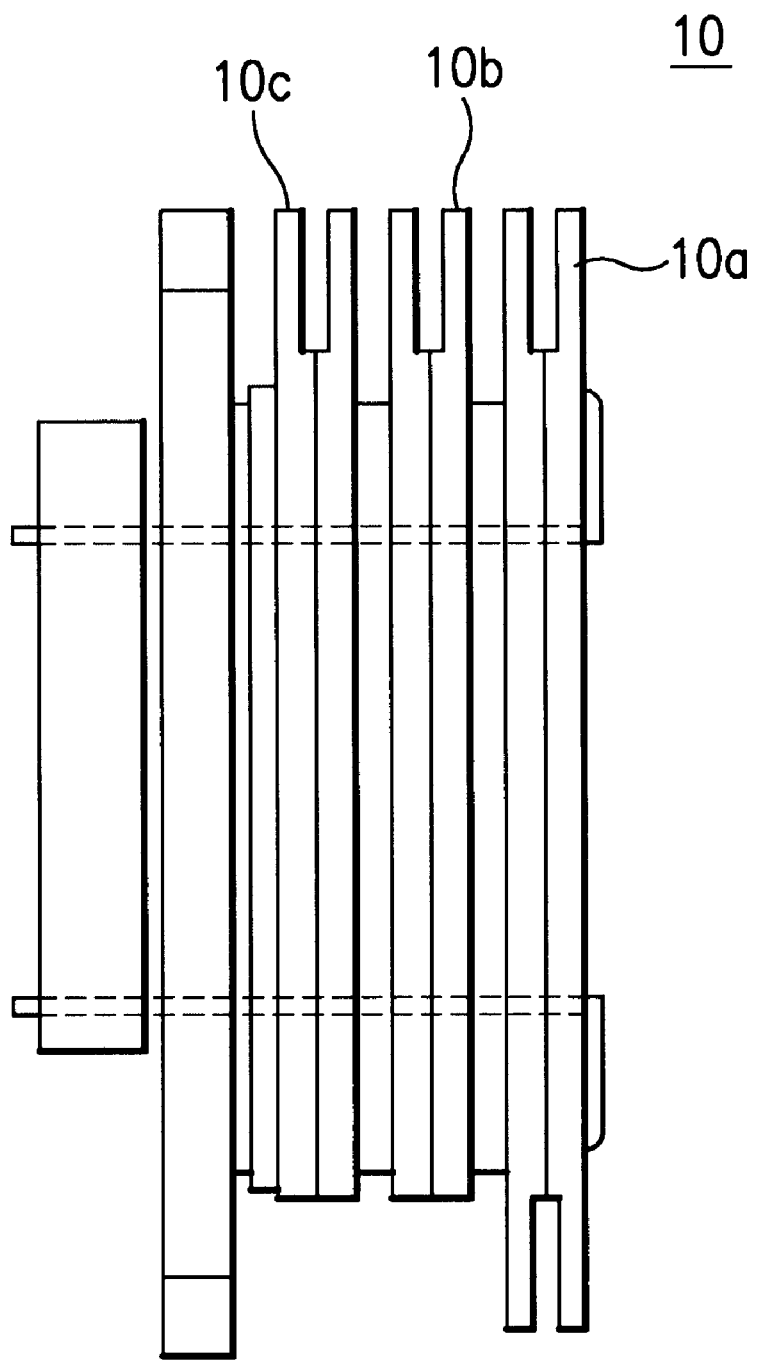
FIG. 4 illustrates a related art color purity magnet.
Figure 5A:
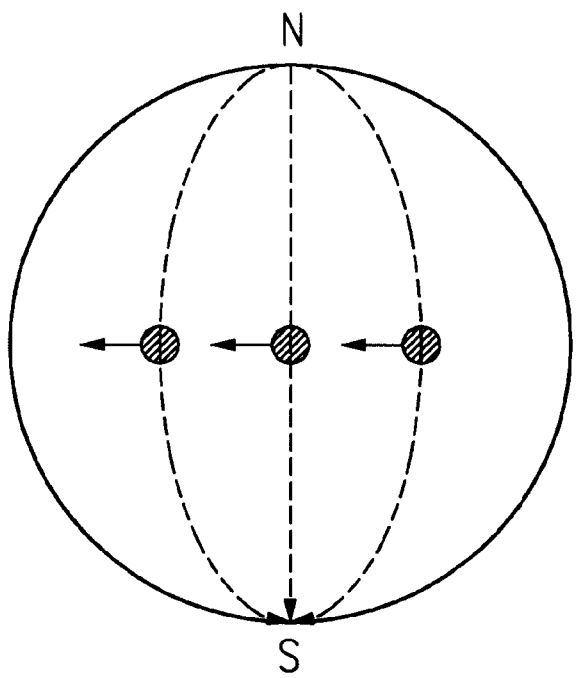
FIGS. 5A–5C illustrate examples of shifts of the electron beams caused by a set of combinations of two annular magnets.
Figure 5A:
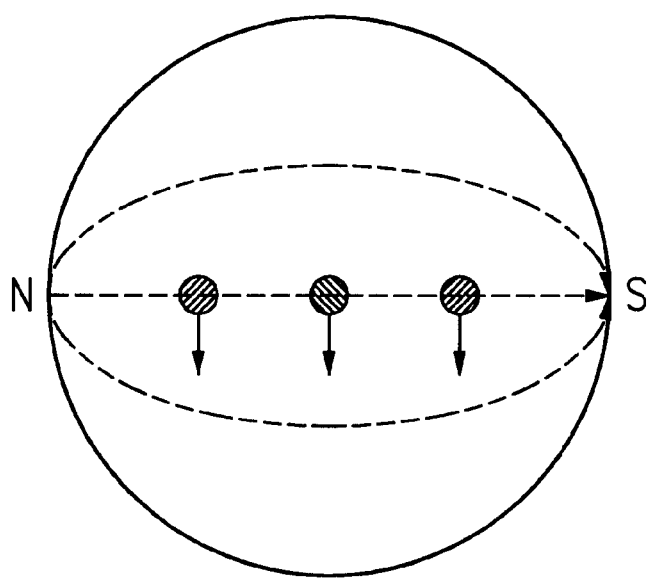
Figure 5B:
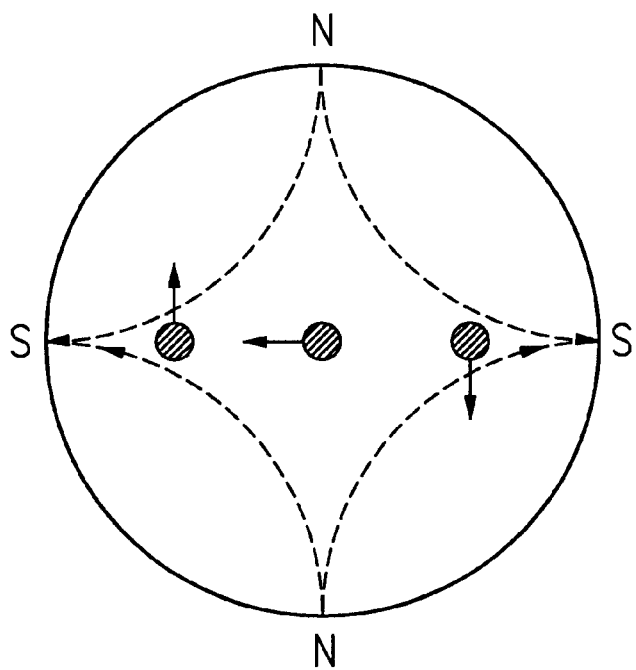
Figure 5B:
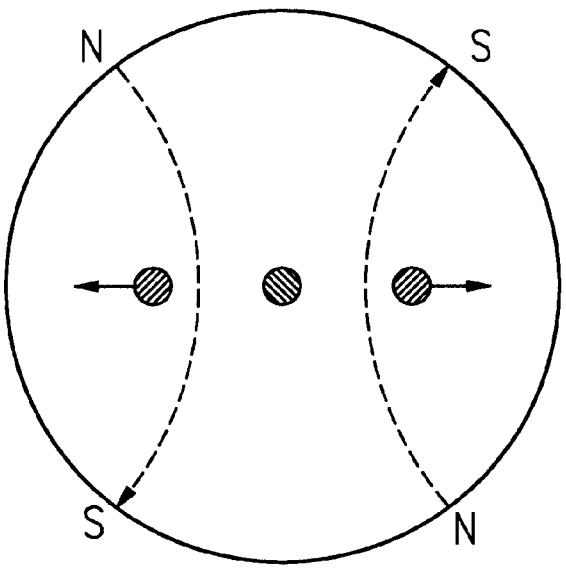
Figure 5C:
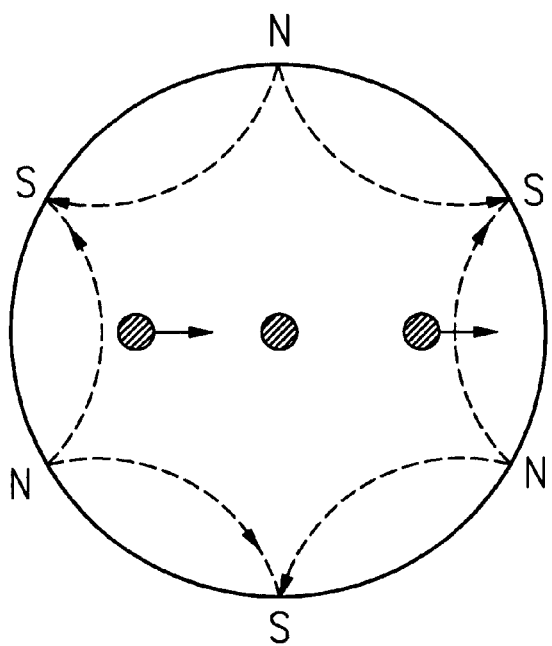
Figure 5C:
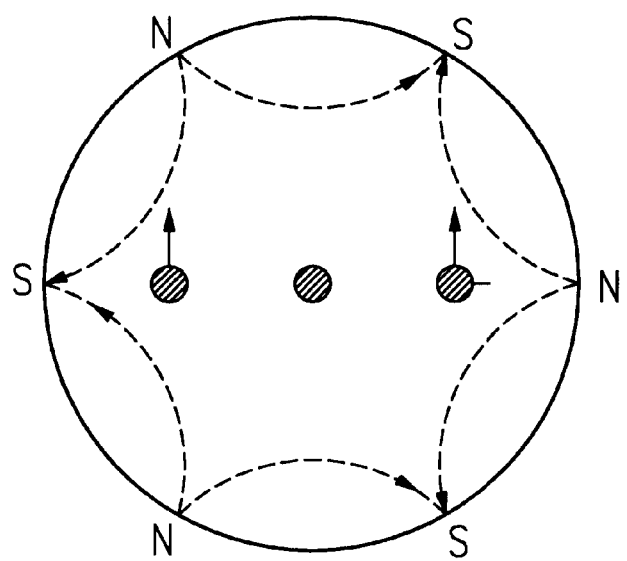

Different from the related art electron gun with three cathodes emitting three electron beams on the same time used currently, the electron gun 2 of the present invention has a single cathode 21 emitting only a single electron beam in response to a signal from the time division distributor 1. When the time division distributor 1 receives, for example, a white color video signal, the cathode 21 emits single electron beams in succession to be landed on red, green, and blue fluorescent materials respectively with time intervals in response to a signal from the time division distributor 1. The magnetic field generating device 5 receives a signal from the digital controller 4 synchronous to the signal from the time division distributor 1 and the deflection signal and shifts the electron beam so as to be landed an any one of the red, green, and blue fluorescent materials. The magnetic field generating device 5 is made possible to generated a magnetic field by a combination of any one, or more of the bipolar, tetrapolar, or hexapolar coil assemblies 51, 52 and 53 and by a control on a current, for shifting the electron beam to a desired position. In detail, the digital controller 4 has optimal positions stored therein which allow the electron beam to land on red, green or blue fluorescent material all over the screen according to a deflection position of the electron beam. Accordingly, upon reception of the deflection signal and the video signal, the digital controller 4 calculates an optimal position of the electron beam taking a mis-landing, a mis-convergence, and changes of spacings between the three electron beams into account, and provides a signal to the magnetic field generating device, so that the magnetic field generating device generates a magnetic field for shifting the single electron beam. The dotted lines in FIGS. 1 to 3 illustrate examples showing a mis-convergence, mis-landings, changes of spacings between three electron beams, and a distortion, all of which are corrected as electron beam is shifted by the magnetic field generating device of the present invention.

The system for correcting an electron beam from a single cathode in an electron gun for a color CRT of the present invention can precisely control a single electron beam without affecting other electron beams because the system of the present invention controls, not a plurality of electron beams, but only the single electron beam. And, because the system of the present invention variably shifts the electron beam synchronous to an electron beam deflection and a video signal, the electron beam can be landed in an optimal condition of the panel regardless of a deflection position of the electron beam. Thus, the system for correcting an electron beam from a single cathode in an electron gun for a color CRT of the present invention not only allows to achieve a high resolution, but also improves a picture quality when other media (a text, a still image, a PC image, and the like) is connected thereto.

It will be apparent to those skilled in the art that various modifications and variations can be made in the system for correcting an electron beam from a single cathode in an electron gun for a color CRT of the present invention without departing from the spirit or scope of the invention. Thus, it is intended that the present invention cover the modifications and variations of this invention provided they come within the scope of the appended claims and their equivalents.

What is claimed is:

1. A system for correcting an electron beam from a single cathode in an electron gun for a color CRT comprising:
    a time division distributor for receiving a video signal and generating one of electron beam signals corresponding to a red, a green, or a blue fluorescent material;
    an electron gun with a single cathode for receiving any one of red, green, blue signals from the time division distributor and emitting a single electron beam;
    a deflection yoke for receiving a deflection signal and deflecting the electron beam emitted from the cathode to an entire region of a screen;
    a digital controller for receiving a signal from the time division distributor and the deflection signal; and,
    a magnetic field generating device for receiving a signal from the digital controller and correcting the electron beam in advance before deflection of the electron beam to a preset position.

2. A system as claimed in claim 1, wherein the magnetic field generating device is mounted between the deflection yoke and a free end of a neck portion of the color CRT.

3. A system as claimed in claim 2, wherein the magnetic generating device is mounted on an outside of the neck portion corresponding to a position between an acceleration electrode and a free focus electrode or between the acceleration electrode and a focusing electrode of the electron gun inside of the neck portion for easy shifting of the electron beam.

4. A system as claimed in claim 3, wherein the magnetic generating device includes;
    a bipolar coil assembly for generating a bipolar magnetic field,
    a tetrapolar coil assembly for generating a tetrapolar magnetic field, and
    a hexapolar coil assembly for generating a hexapolar magnetic field.

5. A system as claimed in claim 4, wherein the bipolar coil assembly includes a combination of coils for generating N, S, S, N poles at positions of 3, 6, 9, 12 o'clock with reference to an axis of the neck, respectively.

6. A system as claimed in claim 4, wherein the tetrapolar coil assembly includes a combination of coils for generating S, S, N, N, S, S, N, N poles at positions 1.5, 3, 4.5, 6, 7.5, 9, 10.5, 12 o'clock with reference to an axis of the neck, respectively.

7. A system as claimed in claim 4, wherein the hexapolar coil assembly includes a combination of coils for generating S, S, N, N, S, S, N, N, S, S, N, N poles at positions of 1, 2, 3, 4, 5, 6, 7, 8, 9, 10, 11, 12 o'clock with reference to an axis of the neck, respectively.

* * * * *